Patented Oct. 23, 1928.

1,688,831

UNITED STATES PATENT OFFICE.

FRED RANSOHOFF, OF NEW YORK, N. Y., ASSIGNOR TO THE FLEISCHMANN COMPANY, OF NEW YORK, N. Y., A CORPORATION OF OHIO.

METHOD OF TREATING MOLASSES.

No Drawing.   Application filed May 11, 1925.   Serial No. 29,623.

This invention relates to the treatment of impure sacchariferous solutions for use in the fermentation industries and more particularly to the clarification of molasses for use in the manufacture of yeast and has as its general object the carrying out of such treatment in a more efficient and economical manner than heretofore.

A more particular object of the present invention is the treatment of cane molasses as the latter is usually commercially obtained in bulk, or a mixture thereof with other sacchariferous substances for the purpose of removing from the molasses certain substances ordinarily present therein which tend seriously to interfere with its use in processes of manufacturing bakers' yeast and to cause the yeast produced therefrom to be of inferior quality.

A further object of the invention is so to carry out the above treatment or clarification that the sacchariferous material is simultaneously enriched with yeast-assimilable substances of such nature and in such quantities as materially to augment its value in yeast production.

Other objects of the invention will in part be obvious and will in part appear hereinafter.

The invention accordingly comprises the several steps and the relation and order of one or more of such steps with respect to each of the others thereof, which will be exemplified in the method hereinafter disclosed, and the scope of the application of which will be indicated in the claims.

Although sacchariferous yeast-nutrient solutions have in recent years been employed successfully in commercial production of bakers' yeast, utilizing both beet and cane molasses as the principal or exclusive source of sugars, available for the yeast growth, more or less difficulty has been experienced in obtaining uniform results as to quality and yield of yeast, especially when cane molasses is used as a source of sugar material.

Cane molasses as it is ordinarily obtained on the market is unsuitable for fully satisfactory use in most present day processes of yeast production for the reason that it usually contains comparatively large amounts of the heavier metals such as iron, aluminum, magnesium and calcium, and is also contaminated with considerable quantities of dirt, sand and various colloidal and pectine substances of unknown composition. Some of these substances are detrimental from the standpoint of the yeast manufacturer for the reason that if they are allowed to remain in the solution they tend deleteriously to affect the baking and keeping qualities of the yeast, causing rapid discoloration thereof and rendering it generally objectionable for bakers' use, while some are of such a nature as to render the molasses very difficult of filtration. Moreover, cane molasses is largely deficient in substances which are considered to be highly desirable in the commercial manufacture of yeast as for example, yeast-assimilable nitrogen, potassium, and phosphorus.

By the use of the present invention not only are the substances detrimental to the yeast-nutrient solution and which have heretofore been found to be quite difficult of removal, effectively removed from the solution, but the solution is simultaneously enriched to a considerable degree in the above mentioned substances which are so desirable from the standpoint of yeast manufacture.

According to the present invention, the clarification of the molasses is accomplished by diluting the same and rendering it distinctly alkaline by the addition thereto of suitable alkali materials or a mixture of such materials, containing one or more components which are readily assimilable by yeast, and in which the raw material is deficient, such as, for example, the hydroxides or carbonates of ammonium or potassium or mixtures thereof, and adding thereto a suitable substance capable of forming therein a phosphate precipitate hereinafter referred to as a "phosphate precipitant", as for example, phosphoric acid or the phosphates of ammonium or potassium, whereupon the molasses is heated moderately to complete the formation of the precipitate and is filtered in any suitable manner with or without the aid of the well known aids to filtration, such as for example, kieselguhr, filtercel and the like.

The following is a specific example of the method of carrying out the process:

The molasses is slightly diluted with water to the amount of about 2 parts of water to 1 part of molasses by volume, although a greater dilution may be used if desired. To the diluted molasses sufficient aquaammonia is added to render the same distinctly alkaline, as for example, to a degree such that 2.0 cc. normal sulphuric acid solution will be required to neutralize 100 cc. of the alkaline molasses. The quantity of alkali substances required for this purpose may vary somewhat for different batches of cane molasses in view of the fact that the latter as usually obtained on the market possesses varying degrees of acidity.

After the diluted molasses has been rendered alkaline as described, there is added to it a suitable quantity of mono-ammonium-dihydrogen phosphate ($NH_4H_2PO_4$) as for example, about 1% of the original weight of the molasses under treatment before dilution. The phosphate is preferably added to the diluted molasses in the form of an aqueous solution of any convenient strength, and after its addition the mass is mixed thoroughly and heated moderately to a temperature sufficient to complete the precipitation and clarification, as for example, to from between 80° C., and the boiling point. This heating not only tends to promote the desired reaction between the added agents and certain constituents of the molasses, but also tends to sterilize the nutrient medium and possibly cause some modification of the constituents thereof so as to render them more readily assimilable when the solution is subsequently used in yeast manufacture.

After the heating has been continued for a sufficient time, as for example, from 1 to 2 hours the solution is allowed to stand until the larger part of the precipitate has settled whereupon the supernatent liquid is drawn off and filtered by any suitable means, as for example, through an ordinary filter press or a Sweetland filter preferably with the use of one of the usual filtering aids such as filtercel, kieselguhr, etc., used for example to the amount of about .5%.

Obviously the above procedure is merely illustrative of the way in which the present invention may be carried out and the materials used can be varied in the manner above set forth, for example, other alkaline compounds of ammonium or potassium or a mixture of such compounds may be used to render the raw materials alkaline and other suitable phosphorus containing materials such as phosphoric acid or potassium phosphate may be used to aid in the formation of the precipitate, the selection of the materials to be used being governed in accordance with the deficiencies of the raw material in the yeast-assimilable constituents afore-mentioned.

The present invention by one and the same treatment accomplishes not only elimination from commercial cane molasses of substances which tend to cause discoloration of yeast produced therefrom, but also may serve to introduce into the purified sacchariferous product at least a considerable proportion of the total quantity of yeast-assimilable nitrogen (and yeast-assimilable potassium also, if desired) necessary to constitute a well proportioned yeast nutrient with the sugar present. This enrichment of the purified molasses with yeast-assimilable nitrogen will take place as described notwithstanding the fact that some of the ammoniacal nitrogen which may be added in the form of ammonia or ammonium phosphate may enter into the composition of the precipitate which is separated from the purified molasses solution.

The yeast nutrient solution thus obtained may then be slightly acidified, for example, with sulphuric acid and may be either wholly or partially diluted to any suitable concentration and employed as a yeast nutrient solution, in any of the well known methods of manufacture utilizing aeration, for the commercial manufacture of bakers' yeast of good quality.

Moreover, if desired, the yeast-assimilable nitrogen content of the cane molasses purified and modified in accordance with my process taken either alone or with added malt sprouts, may be further augmented by causing to be commingled therewith further amounts of suitable substances containing yeast-assimilable nitrogen such as, for example, ammonium salts (as ammonium lactate, sulfate, phosphate, or carbonate), or compounds of an organic nature such as urea and the like. Obviously the commingling of the ammonium lactate may be accomplished if desired, by a controlled propagation of lactate acid bacteria in the solution with accompanying neutralization of the acid formed, by alkaline ammonium compounds, in any case the object being to form a yeast food well balanced with respect to its content of carbohydrate material and substances containing yeast-assimilable nitrogen and phosphorus.

When a bakers' yeast of a type or species such as is ordinarily employed in commercial yeast production is propagated in an aerated nutrient solution prepared in accordance with my present invention a yeast is obtainable on large scale commercial production which is of fully satisfactory keeping quality and baking strength and is fully satisfactory for marketing as a compressed bakers' yeast.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

This application is in part a continuation of my copending application, Serial No. 597,145, filed October 26, 1922.

Having described my invention, what I claim as new, and desire to secure by Letters Patent, is:

1. A method of treating molasses adapted for use in the fermentation industries, which consists in rendering the molasses distinctly alkaline with an alkali compound containing yeast-assimilable components in which the molasses is deficient, adding thereto a substance adapted to form a phosphate precipitate, heating the mixture and thereafter separating the solution from the substances undissolved therein.

2. A method of treating molasses for use in the commercial manufacture of yeast by an aeration process which consists in rendering the molasses distinctly alkaline with an alkali compound containing yeast-assimilable components, adding thereto a phosphate precipitant, heating the mixture moderately and thereafter separating the solution from the substances undissolved therein, the alkali substance and the phosphorus containing substance being so selected and proportioned as materially to supply deficiencies of yeast-assimilable substances in the molasses.

3. A method of treating cane molasses for use in the commercial manufacture of yeast by an aeration process which comprises rendering the molasses distinctly alkaline with an alkali compound containing yeast-assimilable components in which the molasses is deficient, adding thereto a water-soluble phosphorus containing substance adapted to form a precipitate therein, heating the mixture moderately and thereafter separating the solution from the substances undissolved therein, the alkali and precipitating substances being selected from compounds of ammonium, potassium and phosphorus in such proportions as materially to supply the deficiencies of yeast-assimilable substances in the molasses.

4. A method of treating cane molasses for use in the manufacture of yeast by an aeration process, which comprises treating cane molasses with sufficient amounts of alkaline ammonium and potassium compounds to render it distinctly alkaline, adding thereto a water soluble phosphate containing essentially yeast-assimilable constituents, heating the mixture to approximately 80° C., and thereafter separating the solution from the substances undissolved therein.

5. A method of treating cane molasses for use in the manufacture of yeast by an aeration process, which comprises treating cane molasses with sufficient amounts of alkaline ammonium compounds to render it distinctly alkaline, adding thereto a water-soluble phosphate containing essentially yeast-assimilable constituents, heating the mixture to approximately 80° C., thereafter separating the solution from the substances undissolved therein.

6. A method of treating cane molasses for use in the manufacture of yeast by an aeration process, which comprises treating the molasses with sufficient ammonia to render it alkaline, adding an ammonium phosphate and thereafter separating the solution from substances undissolved therein.

7. A method of treating cane molasses for use in the manufacture of yeast by an aeration process, which comprises treating the molasses with sufficient ammonia to render it alkaline, adding an ammonium phosphate, heating the mixture to approximately 80° C., and thereafter separating the solution from substances undissolved therein.

8. A method of treating cane molasses for use in the manufacture of yeast by an aeration process, which comprises treating the molasses with sufficient ammonia to render it alkaline, adding a quantity of ammonium dihydrogen phosphate equivalent to about 1 per cent of the weight of the molasses originally taken for treatment and thereafter separating the solution from substances undissolved therein.

9. A method of treating cane molasses for use in the manufacture of yeast by an aeration process, which comprises treating the molasses with sufficient ammonia to render it alkaline, adding a quantity of ammonium dihydrogen phosphate equivalent to about 1 per cent of the weight of the molasses originally taken for treatment, heating the solution to approximately 80° C., and thereafter separating the solution from substances undissolved therein.

10. A sacchariferous aqueous solution adapted to be used as a yeast nutrient medium in the production of bakers' yeast by an aeration process, said solution being free from substances causing discoloration of yeast and containing the water soluble constituents of the reaction products of cane molasses, ammonia present in sufficient amounts to render the solution distinctly alkaline and an ammonium phosphate.

11. A sacchariferous aqueous solution adapted to be used as a yeast nutrient medium in the production of bakers' yeast by an aeration process, said solution being free from substances causing discoloration of yeast and containing the water-soluble constituents of the reaction products of cane molasses, ammonia and an ammonium phosphate, together with an admixture of aqueous malt sprout extract.

12. A method of treating cane molasses for use in the manufacture of yeast by an aeration process, which comprises treating cane molasses with re-agents containing yeast assimilable components and which are capable of both freeing the molasses from yeast-discoloring substances and of forming with the molasses residue a substantially balanced yeast ration and filtering the treated molasses.

13. A method of treating cane molasses for use in the manufacture of yeast by an aeration process, which comprises treating cane molasses with re-agents containing yeast assimilable nitrogen and phosphorus in such proportions as to free the molasses from yeast-discoloring substances and to form with the molasses residue a substantially balanced yeast ration, and filtering the treated molasses.

14. A method of treating cane molasses for use in the manufacture of yeast by an aeration process, which comprises rendering the molasses alkaline by the addition of an alkali compound containing yeast-assimilable nitrogen, precipitating from the molasses the yeast-discoloring substances by the addition of substances containing yeast-assimilable phosphorus, and thereafter separating the undissolved substances from the solution, such materials and re-agents being used in such proportions that the resultant medium comprises a substantially balanced yeast ration.

15. A method of treating cane molasses for use in the manufacture of yeast by an aeration process, which comprises rendering the molasses alkaline by the addition of an alkali compound containing yeast-assimilable nitrogen, precipitating from the molasses the yeast-discoloring substances by the addition of substances containing yeast-assimilable phosphorus, separating the undissolved substances from the solution and subsequently rendering the medium slightly acid by the addition of sulphuric acid.

In testimony whereof I affix my signature.

FRED RANSOHOFF.